United States Patent [19]

Kenmochi

[11] Patent Number: 4,740,018
[45] Date of Patent: Apr. 26, 1988

[54] MANIFOLD AND MANUFACTURING METHOD THEREFOR

[75] Inventor: Takeji Kenmochi, Shizuoka, Japan

[73] Assignee: Kohtaki & Co., Ltd., Japan

[21] Appl. No.: 27,136

[22] Filed: Mar. 16, 1987

Related U.S. Application Data

[63] Continuation of Ser. No. 533,559, Sep. 19, 1983, abandoned.

[30] Foreign Application Priority Data

Dec. 28, 1982 [JP]  Japan .......................... 57-228574[U]
Mar. 31, 1983 [JP]  Japan ............................ 58-47517[U]

[51] Int. Cl.⁴ ............................................. F16L 39/00
[52] U.S. Cl. ...................................... 285/150; 285/189; 285/284; 285/328; 249/85
[58] Field of Search .................... 285/150, 137.1, 284, 285/64, 294, 297, 128, 189, 328; 425/117, 129 R; 249/85, 83, 91, 96, 97, 177

[56] References Cited

U.S. PATENT DOCUMENTS

| 1,526,776 | 2/1925 | Dalidz ........................ 249/96 X |
| 1,745,482 | 2/1930 | Goodwin ................. 425/129 R |
| 1,810,434 | 6/1931 | Morse et al. ............... 285/284 X |
| 2,459,201 | 1/1949 | Thomas ........................ 285/9.2 |
| 2,636,752 | 4/1953 | Schane et al. ................ 285/189 |
| 2,639,899 | 5/1953 | Young ....................... 285/128 X |
| 2,759,360 | 8/1956 | Budnick ................... 285/150 X |
| 2,845,657 | 8/1958 | Beare ..................... 425/129 R X |
| 2,903,763 | 9/1959 | Grenell ..................... 285/294 X |
| 2,937,891 | 5/1960 | Gressel ...................... 285/328 X |
| 2,978,225 | 4/1961 | Dallas, Jr. .................. 285/150 X |
| 3,005,968 | 10/1961 | Jones et al. ............... 285/189 X |
| 3,174,188 | 3/1965 | Wood ............................. 249/83 |
| 3,213,581 | 10/1965 | Macchi ....................... 249/83 X |
| 3,267,398 | 8/1966 | Van Iperen et al. .......... 285/328 X |
| 3,334,457 | 8/1967 | Hudson et al. ............. 285/189 X |
| 3,574,356 | 4/1971 | Salerno et al. .............. 285/137 R |
| 3,922,768 | 12/1975 | Takayasu .................. 285/189 X |
| 3,941,409 | 3/1976 | Rameau .................... 285/189 X |
| 4,082,324 | 4/1978 | Obrecht .................... 285/137 R |
| 4,175,615 | 11/1979 | Blair ....................... 285/189 X |
| 4,381,908 | 5/1983 | Roth ........................ 425/129 R |
| 4,427,173 | 1/1984 | Mackay .................... 249/177 X |

FOREIGN PATENT DOCUMENTS 48-24989  7/1973  Japan .
52-44993  3/1977  Japan .

Primary Examiner—Thomas F. Callaghan
Attorney, Agent, or Firm—Parkhurst & Oliff

[57] ABSTRACT

A manifold which are widely applicable for oil pressure, water pressure or pneumatic pressure equipments is manufactured, instead of grinding or boring machining process on an ingot, by forming a fluid passage with a pipe group and casting this pipe group in a casting member or supporting the same with a surface plate or a base plate which may double as a surface plate, thereby achieving a light-weight manifold of a high precision and of a simple structure.

9 Claims, 5 Drawing Sheets

MANIFOLD AND MANUFACTURING METHOD THEREFOR

This is a continuation of application Ser. No. 533,559 filed Sept. 19, 1983, now abandoned.

BACKGROUND OF THE INVENTION

The present invention relates to a manifold and the manufacturing method therefor.

A manifold which is indispensable for a machine tool, especially for an oil pressure valve, is known to be extremely difficult to design and machine. A solid-shaped ingot which is to be machined for a manifold is heavy and has to be moved by a crane every time it is machined, making the whole process very troublesome. In addition, if a dead zone remains near where fluid passages (an oil pressure passage, for example) intersect at the time of machining, shavings are liable to deposit therein which are difficult to be washed out. In order to eliminate such dead zones, it is necessary to have machining near the intersections of fluid passages so as to form the above-mentioned fluid passages penetrating from one side to the other side and to provide blank caps after inserting a rod reversely to near these intersections. This is inconvenient and it increases manufacturing costs. As a countermeasure, a technique has been proposed wherein a manifold is formed in separate parts and then assembled at the final stage, to make a manifold of a cubic shape or a block shape. However, manufacturing a manifold in separate parts to be assembled later is not practical since the connection of fluid passages inside becomes more three-dimensional than two-dimensional and is extremely complicated.

SUMMARY OF THE INVENTION

The present invention was conceived in order to overcome the aforementioned drawbacks of the prior art and to provide a manifold which is highly precise but easy to design and machine and the manufacturing method thereof. It is characterized in that a complicated fluid passage is formed in advance with groups of pipes and these groups of pipes are supported by at least either one of a cast main body or a base plate to form a cubic shape.

BRIEF DESCRIPTION OF THE DRAWINGS

FIGS. 1 to 6 show the first embodiment according to the present invention wherein:

FIG. 1 is a perspective view showing the formation of a fluid passage made by pipe groups;

FIG. 2 is a perspective view of the manifold as a whole showing a main body in which pipe groups are cast;

FIG. 3 is an enlarged cross-sectional view taken along a line III—III shown by an arrow in FIG. 2;

FIGS. 4 and 5 are perspective views showing the connection of pipes by means of a joint;

FIG. 6 is a partical enlarged cross-sectional view of an outer side of the main body showing a joint used at the tip of a pipe;

FIGS. 7 to 10 show the second embodiment according to the invention wherein:

FIG. 7 is a perspective view showing the connection between a group of pipes and a surface plate;

FIG. 8 is a view showing a group of pipes and a surface plate cast in the main body;

FIG. 9 is an enlarged cross-sectional view taken along a line IX—IX shown by an arrow in FIG. 8;

FIG. 10 is an enlarged cross-sectional part view showing the surface plate on which components of other mechanism are attached.

DETAILED DESCRIPTION OF THE PREFERRED EMBODIMENTS

Figure 1:
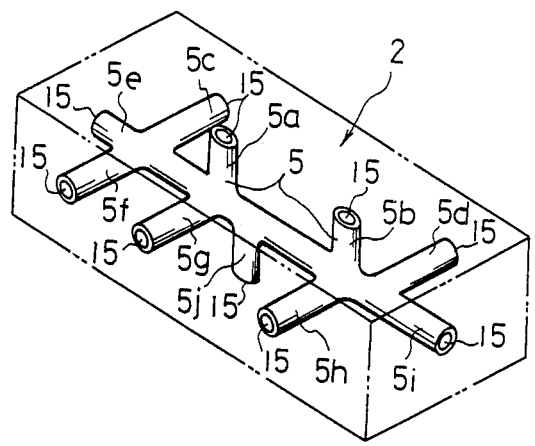
Figure 2:
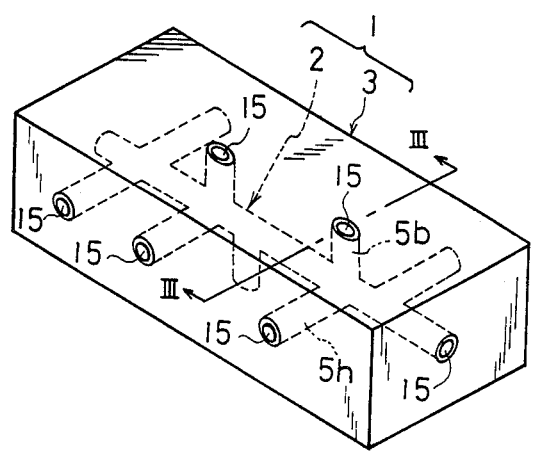
Figure 3:
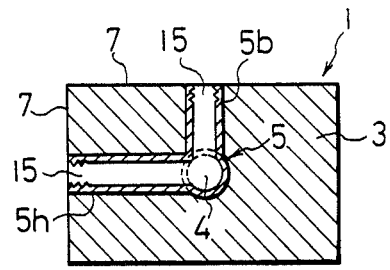

The present invention is now described in detail referring to the drawings.

FIGS. 1 to 6 show the first embodiment of a manifold and its manufacturing method wherein a manifold 1 is mainly structured with a group of pipes 2 and a cast main body 3. The group of pipes 2 are provided internally with a fluid passage 4 of multiple communication and formed to be a "manifold pipe" by connecting plural pipes 5 by means of welding or other techniques, thereby constructing a complicated fluid passage 4 (e.g. oil pressure passage) which can meet requirements as an effective manifold 1.

The main body 3 forms a main body of a manifold 1 wherein the group of pipes 2 are inside and a cast is formed around the pipes and is made into a cube-shape required for a manifold 1 as the finished product by utilizing metal material, resin material, etc. As to the above pipe groups 2, end tip members 5a–5j of each pipe 5 are placed so that they are exposed on the corresponding outer surface 7 (surface member of a finished product) of the main body 3 so that they are freely connectable to opposite members (for example, an oil pressure valve). When end tips 5a–5j of each pipe 5 are in the casted main body 3, a slight displacement in position on the outerface member 7 may sometimes occur, but there arises no inconvenience if such connecting means are adopted as a pipe or a hose (especially a flexible hose) which can absorb small discrepancies in position at the time of connecting them to the pipe tips.

Figure 4:
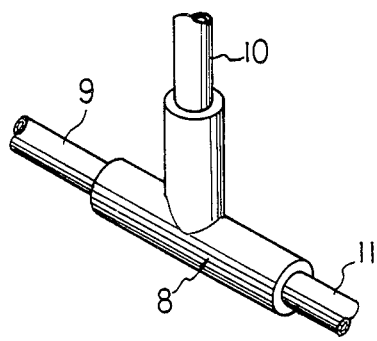
Figure 5:
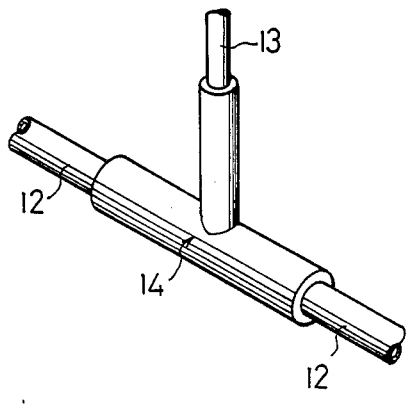

The manufacturing method of the manifold 1 is now described referring to FIGS. 1–6. First of all, a fluid passage 4 of multiple communication is formed by a group of pipes 2. This is achieved by making a plural number of pipes 5 into a "manifold pipe" by welding, etc., and in order to prevent oxidation at the time of and after welding, inert gas such as nitrogen gas may be sealed in the pipe 5 in advance to freely move therein. "A manifold pipe" can be formed by connecting pipes 9, 10 and 11 by screwing or welding with a joint 8 such as a three-way pipe shown in FIG. 4. In case of connecting pipes with different diameters 12, 13 as shown in FIG. 5, a joint 14 which has the diameters to fit pipes 12 and 13 respectively may be used to overcome difficulties in forming "a manifold pipe".

Figure 6:
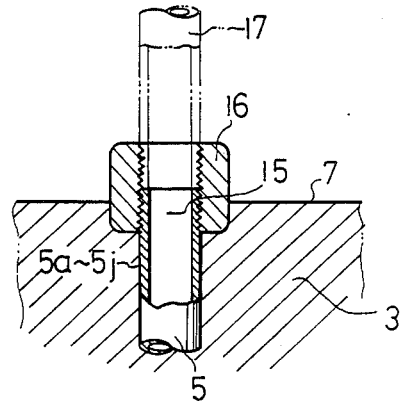
Figure 7:
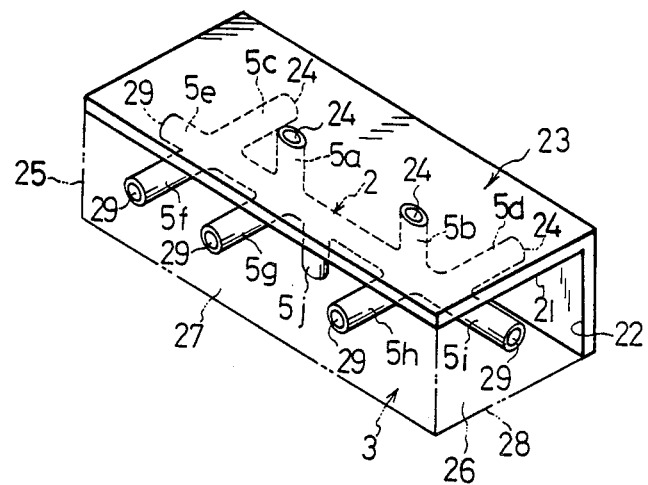
Figure 8:
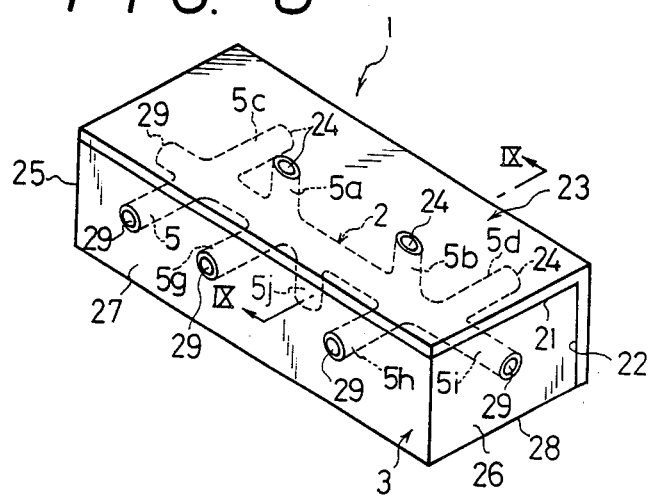
Figure 9:
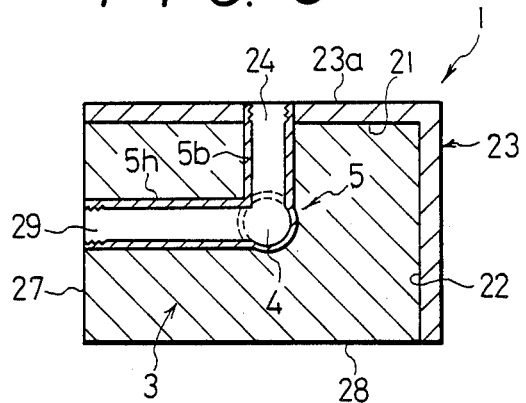

The end tip 5a–5j of each pipe 5 of the group of pipes 2 which are necessary to be connected to opposite members as a finished product of the manifold 1 are placed on a corresponding outer face members 7 (face member as a finished product) in a manner that each connecting port 15 is exposed to outside. A joint 16 in a form of a nut may be mounted over the end tip members 5a–5j as shown in FIG. 6 to project from the outer face member 7 in order to facilitate the connection with opposite members such as a hose or a pipe 17.

Then the group of pipes 2 are cast with metal or resin material in order to integrally form a desired cube-shape. As materials, aluminium (especially reclaimed aluminium), synthetic resin, castings, ductile cast iron, etc. may readily be used, and an extremely light-weight manifold 1 may be manufactured in case when aluminium is used. As any of conventional casting techniques may be used at the time of casting, the explanation thereof in detail is omitted herein. For example, in one conventional casting process which can be used, a sand mould or metal mould having a cube or block shape is prepared. The pipe group is put in the mould and fixed to prevent its movement. The casting material is then poured and cooled. Pressure may be applied. Casting according to this invention is easier than the conventional casting since "cavities" can be ignored, even if they occur in the main body 3, as the fluid passage 4 is formed by the group of pipes 2. The material for plural pipes 5 forming the group of pipe 2 and the main body 3 is determined to suit requirements such as the kind, property, temperature, etc. of the fluid which flows inside the fluid passage 4 in case of the former and the temperature at the time of casting, the total weight as a finished product, the use and function as a manifold 1 in case of the latter.

FIGS. 7 to 10 are related to another embodiment of a manifold and the manufacturing method thereof. In this embodiment, a manifold 1 mainly comprises a group of pipes 2, a surface plate 23 which is placed on face members 21, 22 of a high precision in correspondence to a part 20 or the opposite member to be connected (see FIG. 10) and a main body 3. This embodiment is substantially the same as the embodiment shown in FIGS. 1 to 6 except for the surface plate 23; therefore, identical parts shall be referred to by the identical reference numerals to avoid repetition and only the part which differs from the previous embodiment shall be explained.

In a manifold as a finished product, the surface plate 23 is placed on the face member which needs to have a high precision against the opposite member 20, an oil pressure valve, for example. In the embodiment shown in the figure, the surface plate 23 having an L-shaped cross-section is placed on two face members 21 and 22. On this surface plate 23 is formed ports 24 for connecting pipes by making corresponding end tip members 5a–5d of pipes 5 from said group of pipes 2 protrude from the back side. If the manifold 1 is hexahedral, it is possible to place the surface plate 23 up to 5 faces, leaving one face as a casting side. On face members 25, 26, 27 and 28 which do not need said surface plate 23 extend corresponding end tip members 5e–5j of pipes 5 of the group of pipes 2 and each pipe connecting port 29 shall be kept freely connectable to the part 20 of the opposite port.

It is certainly possible to use joints 8, 14 described in FIGS. 4 and 5 to connect a plural number of pipes 5 or to use the joint 16 described in FIG. 6 at pipe connecting ports 24, 29. The advantages of using these joints 8, 14 and 16 have been mentioned hereinabove.

Figure 10:
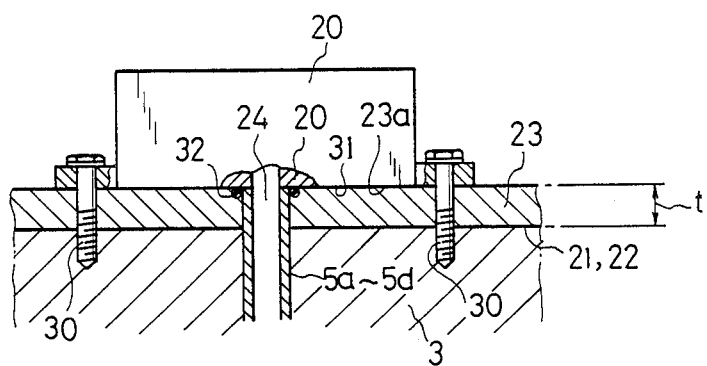

This embodiment is characterized in that the surface plate 23 is placed over face members 21, 22 which require a high precision. The surface plate 23 secures not only "a positional precision" of the pipe connecting port 24 but also "a surface precision" in fixing to an opposite member as well as "an attachment precision." For the surface plate 23, a steel plate of 10–30 mm thick, for example, is used and is ground and polished on the surface side 23a so that the opposite member 20 (for example, an oil pressure valve) can be directly mounted thereon with a set screw 30 as shown in FIG. 10. In this case, the surface side 23a of the surface plate 23 should be given "a mirror finish" to achieve better adherence and sealing effect for a fitting face 31 of the opposite member 20 so that adequate sealing can be obtained simply by providing an O-ring 32 around the pipe connecting port 24 facing thereof, and that the set screw 30 can be satisfactorily fixed by making use of the thickness t.

The manufacturing method of the manifold 1 with above mentioned construction is now explained. As in the previous embodiment, a fluid passage 4 of multiple communication is formed by a group of pipes 2.

On the face members 21, 22 which require a high precision against the opposite member 20 as a finished product of the manifold 1 is placed the surface plate 23, and on the surface side 23a of the surface plate 23 are connected the end tip members 5a–5d of the corresponding pipes of said pipe group 2 from the back side to form pipe connecting ports 24. On the face members 25–28 which do not need the surface plate 23 are faced with the end tip members 5e–5j of the corresponding pipes, leaving a connecting port 29 connectable with the opposite member as a finished product of the manifold 1.

Said pipe group 2 are cast together with the surface plate 23 with a metal material, a resin material, etc. to make a desired integral cubit shape as a whole. In this way, pipes 2 are cast inside the main body 3 to form an integral port and the surface plate 23 is integrally fixed as well by abutting its back side against the main body 3 at the time of casting. It is possible to achieve a better integration by providing legs or protrusions (not shown) on the back side of the surface plate 23 so that they will dig into the main body 3 at casting. Other descriptions shall be omitted since they are substantially the same as the previous embodiment.

Figure 11:
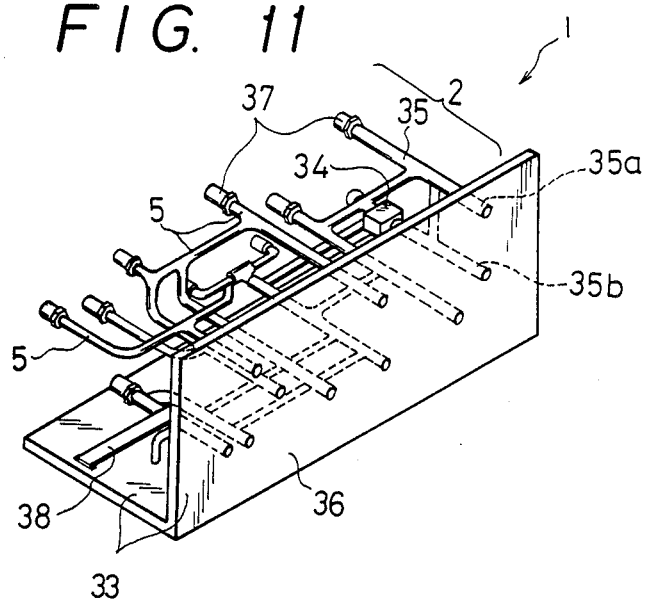
FIG. 11 is a perspective view showing the third embodiment of a manifold according to this invention and FIG. 12 is a perspective view showing the fourth embodiment corresponding to FIG. 11.
Figure 12:
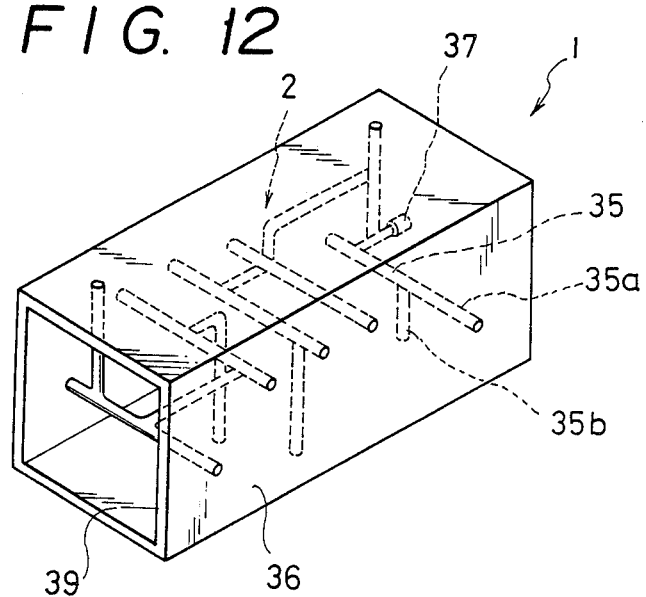

Description is given to the cases wherein a main body 3 is not used, referring to FIGS. 11 and 12.

FIG. 11 shows another embodiment according to the present invention. The manifold 1 mainly comprises a manifold pipe group 2 and a base plate 33 which is also used as a surface plate 23. The manifold pipe group 2 forms a desired fluid passage as a whole by connecting plural pipes 5 directly by welding or indirectly by using a joint 34. The base plate 33, on the other hand, is L-shaped and supports at least one end of manifold pipe group 2. In the figure, a pipe 35 is shown wherein separated end members 35a and 35b are respectively supported by the base plate 33. This base plate 33 not only supports the branched out pipe group 2 but also forms a face member 36 which requires a high precision in mounting against the opposite member such as oil pressure valve, for example, so that it is even more preferable to have a surface finish on the face member 36. Each end member of the branched out pipe group 2 supported by the base plate 33 is cast inside the base plate 33 so as not to project over the face member 36, but it is naturally possible to use an appropriate joint (for example, the joint 16 of FIG. 6) at the time of connection with the opposite member. Reference numeral 37 in the figure denotes a coupling member which is mounted on the end part not supported by the base plate 33 of the branched out pipe group 2 and 38 an arm for support to reinforce the L-shaped base plate 33.

FIG. 12 shows still another embodiment according to the present invention, and in this embodiment, a base plate 39 is a square tube as a whole, supporting each end member of branched out pipe group from 4 sides. Other parts are substantially the same as the embodiment shown in FIG. 11, therefore, they are referred to by the same reference numerals in the figure to avoid repeating explanation.

Since the present invention is as such that has been described above, a marked difference in effect can be expected compared with prior art manifold and the manufacturing method thereof. The main merits may be summed up below:

(a) As a fluid passage is formed inside the pipe group to be connectable by welding, bending, or connecting pipes with joints, the sealing effect (no leakage) is remarkable and machining is easy since an ingot is not cut or bored, giving no worries of dead zones to be left or shavings to be deposited, and any complicated passage, not only two-dimensional but also three-dimensional, can be formed extremely easily, and (b) as a surface plate is placed in advance on the face member which requires a high precision against the opposite member, more than sufficient precisions can be expected on the position of a connecting port or a tip end of a pipe, on the surface for attaching other members and on the attachment, (c) by securely forming the passage by the pipe group, the choice of material for the main body inside of which the pipe group are cast becomes comparatively wide and economical, and furthermore, if an aluminum material is used, the whole weight becomes about one third of the conventional one which will result in better effects not only to the manifold itself but also contributes to lighten the equipment itself which houses the light-weight manifold, and (d) a crane becomes not necessary in machining process.

(e) As the passage is securely formed by a group of pipes, it is not necessary to worry about the occurrence of cavities in the main body and they can be ignored even if they did occur, and (f) a highly precise manifold of wide applicability can be constructed economically in a comparatively short time for oil pressure, water pressure or pneumatic pressure equipments and others.

(g) In addition, if a manifold is formed by using a base plate which also serves as a surface plate instead of the main body in order to support at least one end of the manifold pipe group, the merit of being light-weight mentioned in (c) becomes even more effective.

I claim:

1. A fluid manifold comprising:
    an integral pipe member comprising a plurality of pipe branches having a plurality of end tip members associated respectively therewith;
    a main cast body, said main cast body being of block shape and being cast around said pipe branches, at least two end tip members extending to one side of said main cast body; and
    a surface plate with a plurality of openings therein positioned on at least one side of said main cast body, said surface plate being attached to said at least two end tip members such that said openings communicate therewith, said surface plate having a high precision substantially mirror finished outer surface attachment area adjacent said at least two end tip members attached to said surface plate, for attachment to other high precision equipment.

2. The manifold as set forth in claim 1, wherein said main cast body comprises a metal material.

3. The manifold as set forth in claim 1, wherein said main cast body comprises a resin material.

4. The manifold as set forth in claim 1, wherein said block shape is rectangular and said surface plate is in an "L" shape and is positioned on two sides of said main cast body.

5. A fluid manifold comprising:
    an integral pipe member comprising a plurality of pipe branches having a plurality of end tip members associated respectively therewith; and
    a base plate, said base plate comprising at least two planar surfaces disposed at an angle with respect to each other and having a plurality of openings in each planar surface, said base plate being secured to at least two of said end tip members on each of said planar surfaces, said base plate having a high precision substantially mirror finished outer surface attachment area adjacent said end tip members secured to said base plate, for attachment ot other high precision equipment.

6. The manifold as set forth in claim 5 wherein said manifold consists only of said integral pipe member and said base plate.

7. A method for manufacturing a solid block fluid manifold comprising the steps of:
    forming an integral pipe member comprising a plurality of pipe branches having a plurality of end tip members associated respectively therewith by connecting a plurality of pipes;
    casting a main body around said pipe branches after said pipes have been connected such that at least two of said end tip members extend to one side of said main cast body; and
    connecting said at least two end tip members to a surface plate prior to casting such that said end tip members are in communication with two respective openings in said surface plate, said surface plate being provided with a high precision substantially mirror finished outer surface attachment area adjacent said at least two end tip members connected to the surface plate, for attachment to other high precision equipment.

8. The method for manufacturing the solid block manifold according to claim 7, wherein said main body is cast into a rectangular shape.

9. A fluid manifold comprising:
    an integral pipe member comprising a plurality of pipe branches having a plurality of end tip members associated respectively therewith;
    a main cast body, said main cast body being of block shape and being cast around said pipe branches, said end tip members extending to the outside of said main cast body; and
    an L-shaped surface plate positioned on two sides of said main cast body, said plate having at least two openings in each wall of said L-shaped surface plate, at least two of said tip members being secured to each wall of the L-shaped surface plate in communication with said openings respectively.

* * * * *